Oct. 6, 1931. P. J. LOUTHIAN 1,825,879
HANGER FOR SUPPORTING STRIPS OF BACON
Filed Sept. 23, 1930
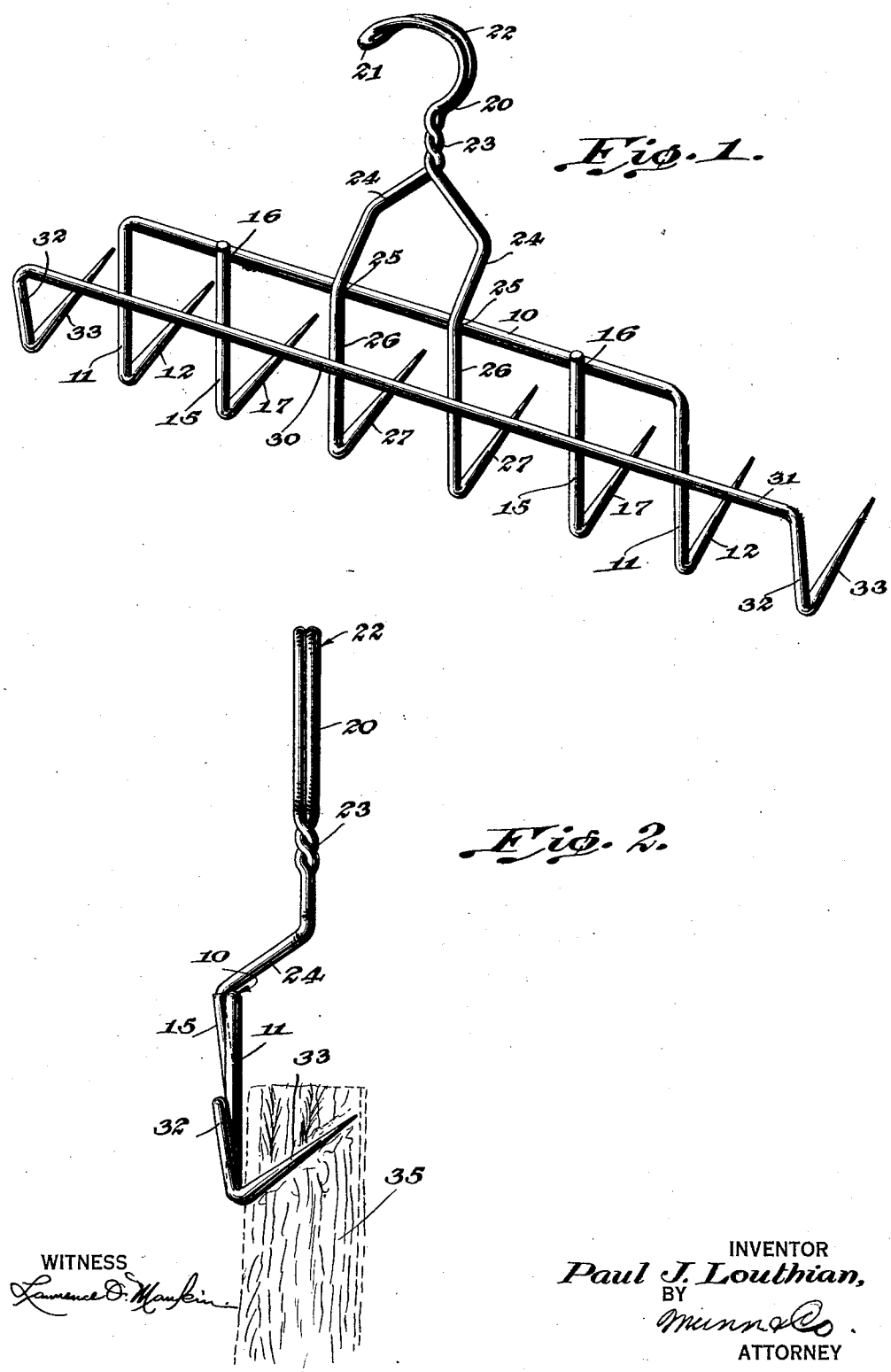
INVENTOR
Paul J. Louthian,
BY
Munn & Co.
ATTORNEY
WITNESS Patented Oct. 6, 1931

1,825,879

UNITED STATES PATENT OFFICE

PAUL J. LOUTHIAN, OF HUTCHINSON, KANSAS

HANGER FOR SUPPORTING STRIPS OF BACON

Application filed September 23, 1930. Serial No. 483,947.

This invention relates to hangers for supporting strips of bacon.

An object of the invention is the provision of a simple and efficient hanger for strips of bacon whereby the bacon may be supported and but a few ounces of the meat at the end of the slab will be damaged.

A further object of the invention is the provision of a hanger in which the teeth engaging the strips of bacon will penetrate the skin without appreciably tearing the meat so that but an extremely small portion of the bacon per se will be injured.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a view in perspective of a bacon hanger constructed in accordance with the principles of my invention;

Figure 2 is a side view in elevation of the hanger.

Referring more particularly to the drawings, 10 designates a horizontal bar having depending arms 11 at right angles to the bar with upturned penetrating points 12 disposed at approximately 45° angle to the members 11. The bar 10 forms the main supporting structure of the hanger.

Located adjacent the members 11 and in parallel relation therewith are depending bars 15 secured at 16 to the bar 10. Penetrating prongs 17 project outwardly and upwardly at approximately an angle of 45° and are in the same plane with the penetrating points 12.

A hanger 20 is formed of a single strand of wire which is bent at 21 approximately midway of its ends and formed into a hook 22. The strands at this point are located in contact with each other and beyond the hook the strands are twisted together, as shown at 23. The remaining portion of the strands, as shown at 24, are bent outwardly and downwardly and are secured at 25 to the bar 10. Where the members 24 are secured to the bar 10 said members are bent at an angle to embrace said bar. The remaining portions of the strands of the hanger are carried downwardly, as shown at 26, in parallel relation and are located in approximately the same plane with the members 11. Penetrating prongs 27 are formed at the ends of the members 26 and are bent outwardly and upwardly and are located in the same plane with the prongs 12 and 17.

A reinforcing bar 30 secured to the depending members 11, 15 and 26 is at the rear of the hanger. This bar is extended outwardly at its ends, as shown at 31, and beyond the members 11. The free ends of the bar are bent downwardly, as shown at 32, and lie in a plane which is closely adjacent to the plane passing through the members 11. The prongs 33 which are formed at the end of the extension 32 are located in the same plane with the prongs 12.

As shown more particularly in Figure 2, the prongs being in the same plane penetrate the strip of bacon 35 at spaced points and in substantially the same plane. Since these prongs are relatively reduced in diameter they will form but slight passages in the bacon thus eliminating considerable waste which is normally had by the usual hooks for the purpose.

I claim:

1. A hanger for bacon comprising a main supporting bar having depending members, penetrating prongs extending laterally and upwardly from the ends of the depending members, rods spaced from the depending members and having the upper ends thereof secured to the main bar, penetrating prongs projecting laterally from the free ends of the rods and located in substantially the same plane with the first mentioned prongs, a supporting means for the hanger including a hook and depending arms secured to the bar, the free ends of the arms being provided with laterally disposed penetrating prongs, a reinforcing bar secured to the depending members, rods and arms and provided with penetrating prongs located in the same plane with the first-mentioned prongs.

2. A hanger for bacon comprising a main supporting bar, having members extending downwardly from the ends of the bar, prongs projecting laterally from the ends of said members, a reinforcing bar secured to the members and intermediate the ends of said members, said reinforcing bar having laterally projecting prongs, a supporting means for the first-mentioned bar and consisting of a strand of wire twisted intermediate the ends to form a hook, the remaining portions of the strand being extended downwardly and provided with laterally disposed prongs, the strand being secured to the main and reinforcing bars, all of the prongs being located in the same plane which is as an angle of 45° to a plane passing through the members projecting from the main bar.

PAUL J. LOUTHIAN.